United States Patent
Segas et al.

(10) Patent No.: US 11,793,308 B2
(45) Date of Patent: Oct. 24, 2023

(54) HEIGHT ADJUSTED SEISMIC BASE ISOLATION SYSTEM

(71) Applicant: EQX Global LLC, Napa, CA (US)

(72) Inventors: Paul J. Segas, Napa, CA (US); Don Clyde, Napa, CA (US)

(73) Assignee: EQX Global LLC, Napa, CA (US)

( * ) Notice: Subject to any disclaimer, the term of this patent is extended or adjusted under 35 U.S.C. 154(b) by 626 days.

(21) Appl. No.: 16/843,369

(22) Filed: Apr. 8, 2020

(65) Prior Publication Data
US 2020/0315350 A1 Oct. 8, 2020

Related U.S. Application Data

(60) Provisional application No. 62/964,322, filed on Jan. 22, 2020, provisional application No. 62/831,119, filed on Apr. 8, 2019.

(51) Int. Cl.
*A47B 91/02* (2006.01)
*B65G 1/02* (2006.01)
*A47B 81/00* (2006.01)

(52) U.S. Cl.
CPC ............ *A47B 91/022* (2013.01); *B65G 1/02* (2013.01); *A47B 81/007* (2013.01); *B65G 2207/20* (2013.01)

(58) Field of Classification Search
CPC ...... A47B 91/022; A47B 81/007; B65G 1/02; B65G 2207/20
See application file for complete search history.

(56) References Cited

U.S. PATENT DOCUMENTS

| | | | | |
|---|---|---|---|---|
| 549,979 | A | * 11/1895 | True | B60T 17/083 91/470 |
| 1,356,182 | A | * 10/1920 | Anderson | A47B 91/04 248/616 |
| 2,681,468 | A | * 6/1954 | Quinn | E05F 3/108 277/439 |
| 3,465,997 | A | * 9/1969 | Piske | F16C 11/12 248/619 |

(Continued)

FOREIGN PATENT DOCUMENTS

| | | | | |
|---|---|---|---|---|
| CN | 108699853 A | * 10/2018 | | B65G 1/02 |
| JP | 10-23527 A | 9/1998 | | |

(Continued)

OTHER PUBLICATIONS

International Search Report and Written Opinion for International Application No. PCT/US20/27264, dated Jul. 9, 2020, 12 pages.

*Primary Examiner* — Kimberly T Wood
(74) *Attorney, Agent, or Firm* — Greenberg Traurig, LLP

(57) ABSTRACT

A seismic isolation system includes at least one adjustable foot attached to a container. The at least one adjustable foot has a height at least sufficient to support the container such that the container does not touch a surface on which the container rests. The seismic isolation system further includes a sliding pad affixed to a portion of the at least one adjustable foot facing the surface. The sliding pad is configured to provide a coefficient of static and kinetic friction between the sliding pad and the surface that prevents relative movement of the sliding pad and the surface in normal operation and allows the sliding pad to move relative to the surface during a seismic event.

10 Claims, 16 Drawing Sheets

(56) References Cited

U.S. PATENT DOCUMENTS

| | | | |
|---|---|---|---|
| 3,672,004 A | 6/1972 | Smith | |
| 5,310,156 A * | 5/1994 | Matsumura | A47B 91/00 248/188.9 |
| 5,402,557 A | 4/1995 | Dalen | |
| 5,964,066 A * | 10/1999 | Mori | E04H 9/021 52/167.6 |
| 6,848,223 B2 * | 2/2005 | Singh | G21F 5/06 248/676 |
| 9,097,027 B2 | 8/2015 | Clyde et al. | |
| 10,125,511 B2 * | 11/2018 | Stefani | E04H 9/0215 |
| 10,356,935 B2 * | 7/2019 | Segroves | A47B 91/026 |
| 11,002,031 B2 * | 5/2021 | Colenso | E04H 9/0235 |
| 2003/0144568 A1 * | 7/2003 | Singh | G21F 5/08 588/1 |
| 2003/0230700 A1 * | 12/2003 | Kemeny | F16M 7/00 248/677 |
| 2006/0237378 A1 * | 10/2006 | Pellegrino | B65G 1/02 211/29 |
| 2013/0018018 A1 | 7/2013 | Takeshita et al. | |
| 2015/0225975 A1 * | 8/2015 | Sugita | F16F 15/02 52/167.1 |
| 2015/0245711 A1 * | 9/2015 | Hamaba | H05K 5/0234 248/188.8 |
| 2016/0102461 A1 * | 4/2016 | Charles | E04H 9/021 52/183 |
| 2019/0077596 A1 | 3/2019 | Stefani et al. | |
| 2020/0011391 A1 * | 1/2020 | Allen | F16F 1/027 |

FOREIGN PATENT DOCUMENTS

| | | | | |
|---|---|---|---|---|
| KR | 20180074181 A * | 7/2018 | | |
| WO | WO-2010125775 A1 * | 11/2010 | | F16C 23/045 |
| WO | WO-2013125234 A1 * | 8/2013 | | E04H 9/028 |
| WO | WO-2016103073 A1 * | 6/2016 | | B65G 1/02 |
| WO | WO-2017141105 A1 * | 8/2017 | | B65G 1/02 |
| WO | 2017165390 A1 | 9/2017 | | |

* cited by examiner

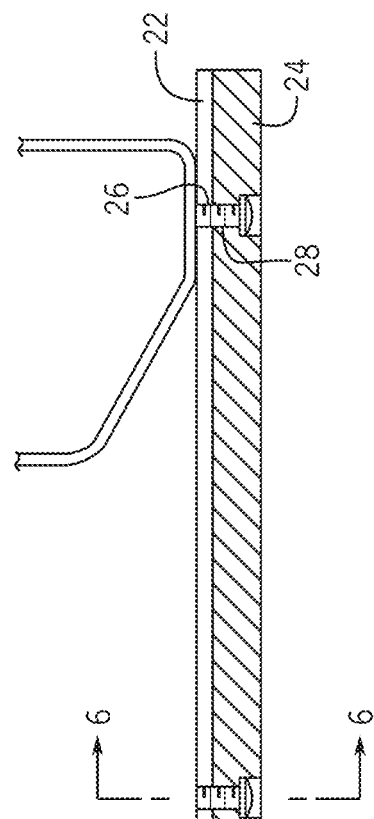
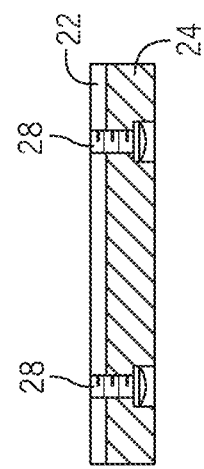

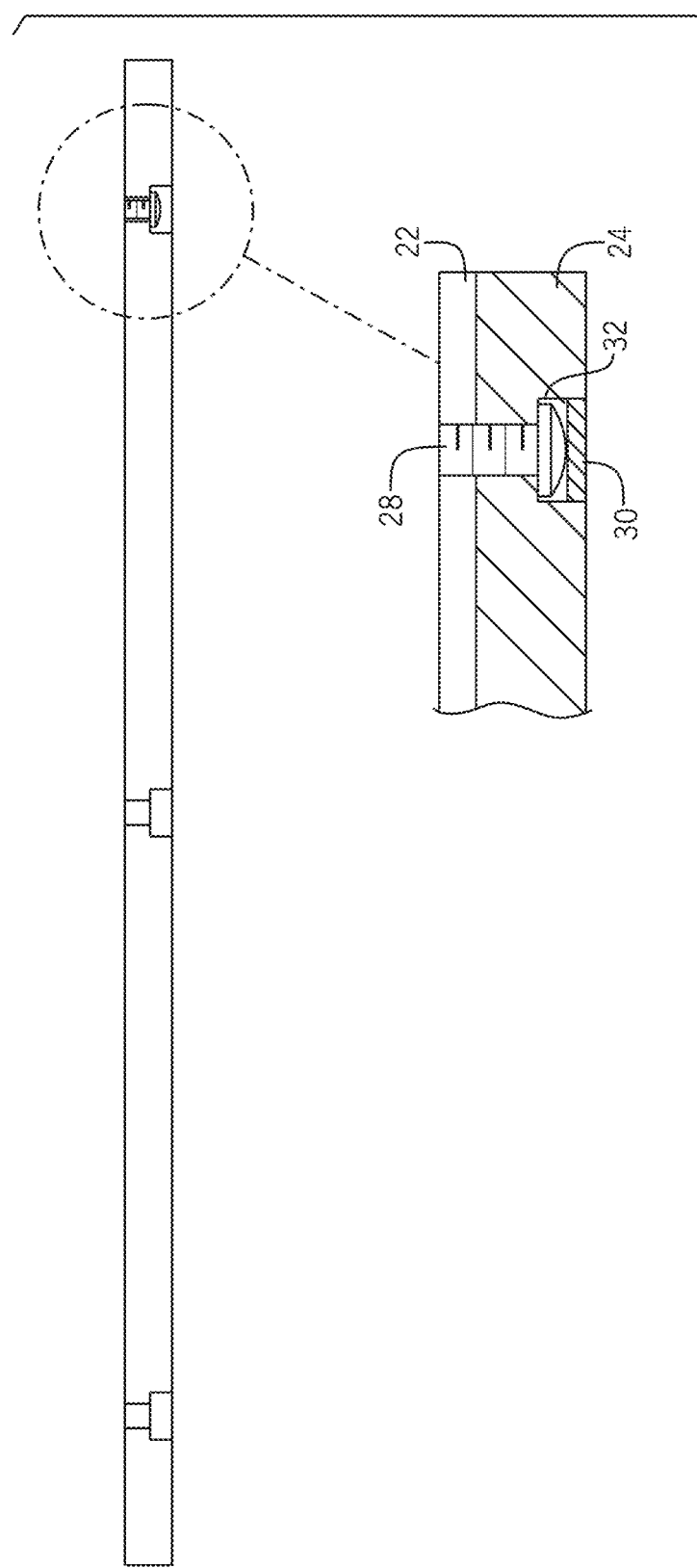

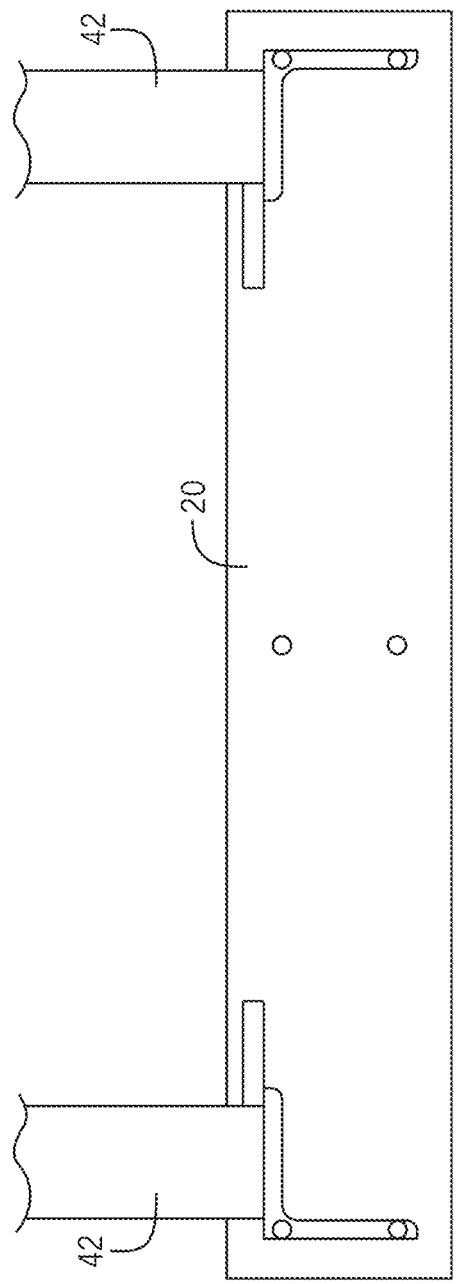
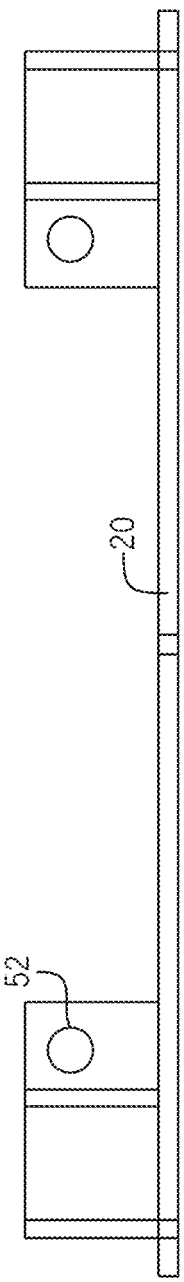
FIG. 12A
FIG. 12B

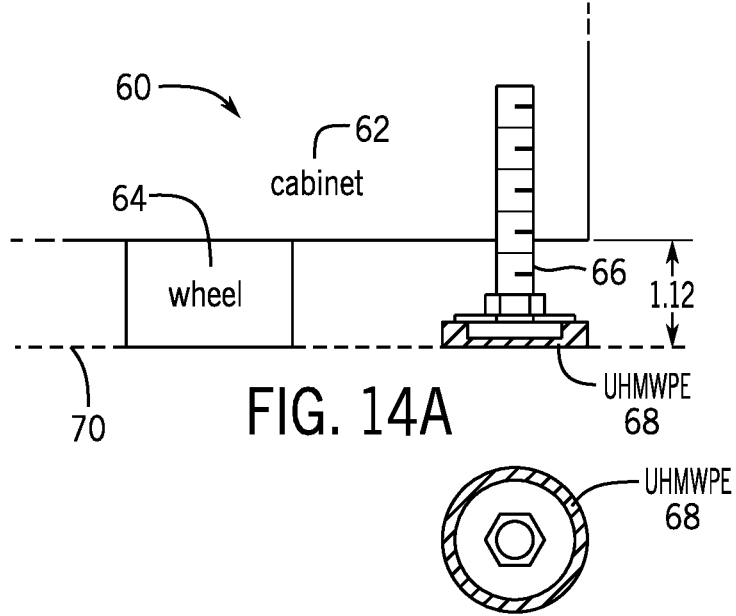
FIG. 14A
FIG. 14B
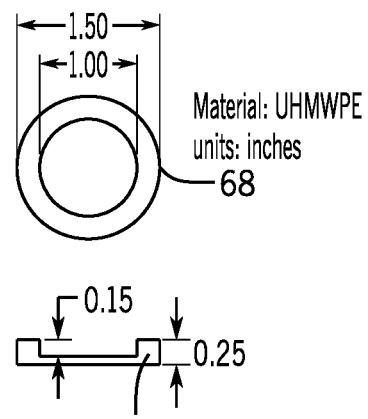
FIG. 14C
FIG. 14D

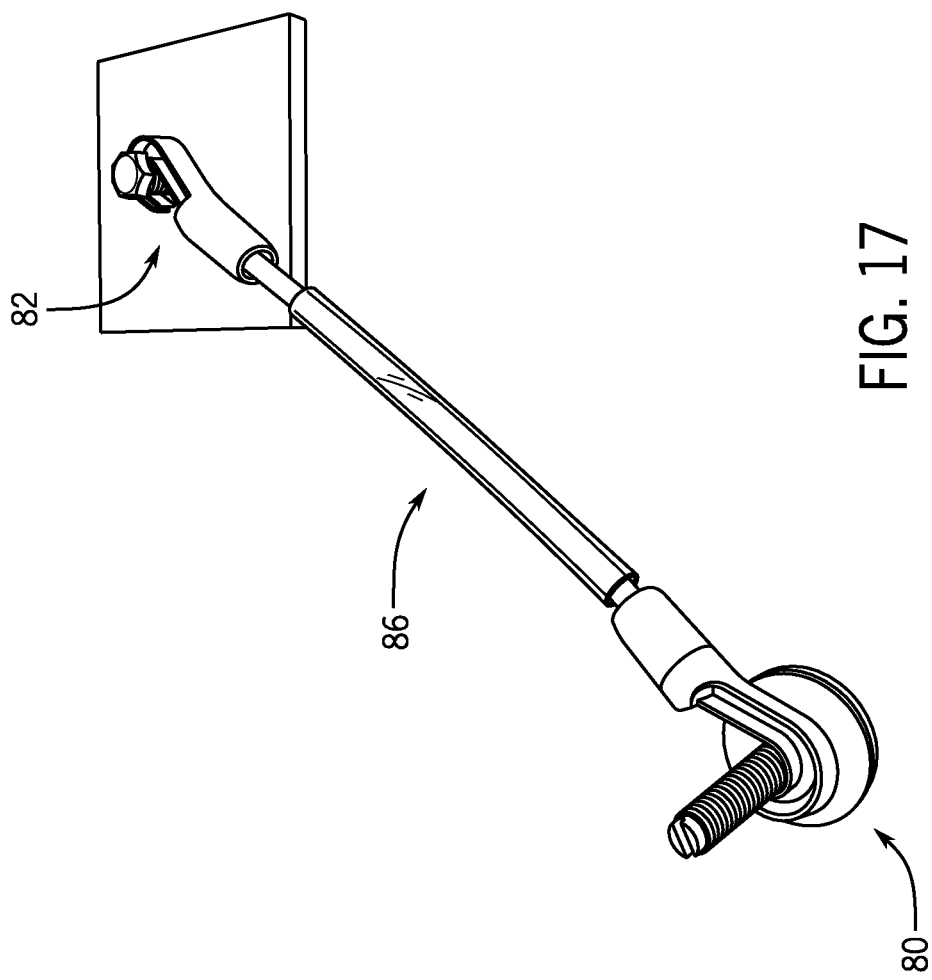

HEIGHT ADJUSTED SEISMIC BASE ISOLATION SYSTEM

CROSS REFERENCE TO RELATED APPLICATIONS

This application claims priority to U.S. Provisional Application Ser. No. 62/831,119, filed on Apr. 8, 2019, and U.S. Provisional Application Ser. No. 62/964,322, filed on Jan. 22, 2020, each of which is incorporated herein by reference in its entirety.

FIELD OF THE DISCLOSURE

The present disclosure relates generally to a frictional base isolation system for use in racks to protect wine barrels from seismic damage, and more particularly to a seismic base isolation system for barrel racks.

BACKGROUND OF RELATED ART

Seismic engineering has long been applied to protecting buildings from the dangers of earthquakes and other tectonic events. Where stiffness was prized in the building of ancient sites like Chichen Itza to help the structure survive the shifting earth, modern architects and engineers prize flexibility to weather the forces of an earthquake. One common system used is base isolation, which allows the structure to move independently of the foundation, thus isolating the base from sudden shifts of the foundation. One of the oldest known examples of an isolated base is the Tomb of Cyrus, a structure dedicated to the first ruler of the Persian Empire.

Modern seismic isolation systems, such as floors or plates designed to isolate equipment from sudden foundational shifts can be important in various applications. In particular, seismic base isolation systems are oftentimes powerful tools of earthquake engineering and often used to isolate non-structural contents of a building and/or sensitive equipment against sudden ground motions, which may be caused by a seismic event, such as earthquake, a natural event, a blast wave, etc. Typical applications for seismic isolation systems including buildings with high value assets, such as data centers, hospitals, museums, manufacturers with critical equipment, warehouses, laboratories and/or any application where it is important to protect critical assets. One goal of any seismic isolation system is to maximize safety, business continuity, and preservation of irreplaceable items.

Many American wine producers are located in tectonically active areas, especially the world-renowned Napa Valley region. A wine barrel can hold about 60 gallons (228 liters) of wine and can weigh more than a quarter ton. Depending on the type of wine to be produced, the wine may spend anywhere from a few months to as many as ten years in a barrel to age.

After the dust settled from the earthquake in August 2014, Napa Valley vintners and their surrounding community lost an estimated $100 million. While modern building codes limited damages to many structures, there is no industry standard or regulation as to barrel storage. Few winemakers had specific systems to protect the storage structures within their buildings in spite of the fact that each barrel can be worth tens of thousands in lost profit if lost in an earthquake.

U.S. Pat. No. 9,097,027 describes a seismic isolation system which uses two plates a base plate and a top plate. The base plate has a textured top surface and the top plate is positioned above it with a non-textured bottom surface. Either surface can have a coating such as polyester or a low surface energy coating to modify the frictional characteristics of the surface. In normal operation, the coefficient of static friction prevents relative motion of the two plates. In a seismic event, the top plate can move relative to the base plate. The system optionally can contained an internal damper to provide displacement control. The whole of U.S. Pat. No. 9,097,027 is incorporated herein by reference in its entirety.

BRIEF DESCRIPTION OF THE DRAWINGS

FIG. 5 is a cross-sectional view of the isolation pad taken along line 5-5 in FIG. 4.

FIG. 6 is a cross sectional view of the isolation pad taken along line 6-6 in FIG. 5.

FIG. 7 is a side elevated detailed view of the attachment means of the isolation pad of FIG. 2A.

FIG. 12A is a top plan view of the isolation pad of FIG. 11.

FIG. 12B is a front plan view of the isolation pad of FIG. 11.

FIGS. 14A-D are depictions of an example seismic isolation system for installation on an individual data cabinet according to the teachings of this disclosure.

FIG. 17 is an example of an anchor, leveling leg, and elastomeric band of a portion of an example standalone cabinet seismic isolation installation according to the teachings of this disclosure.

DETAILED DESCRIPTION

Figure 1:
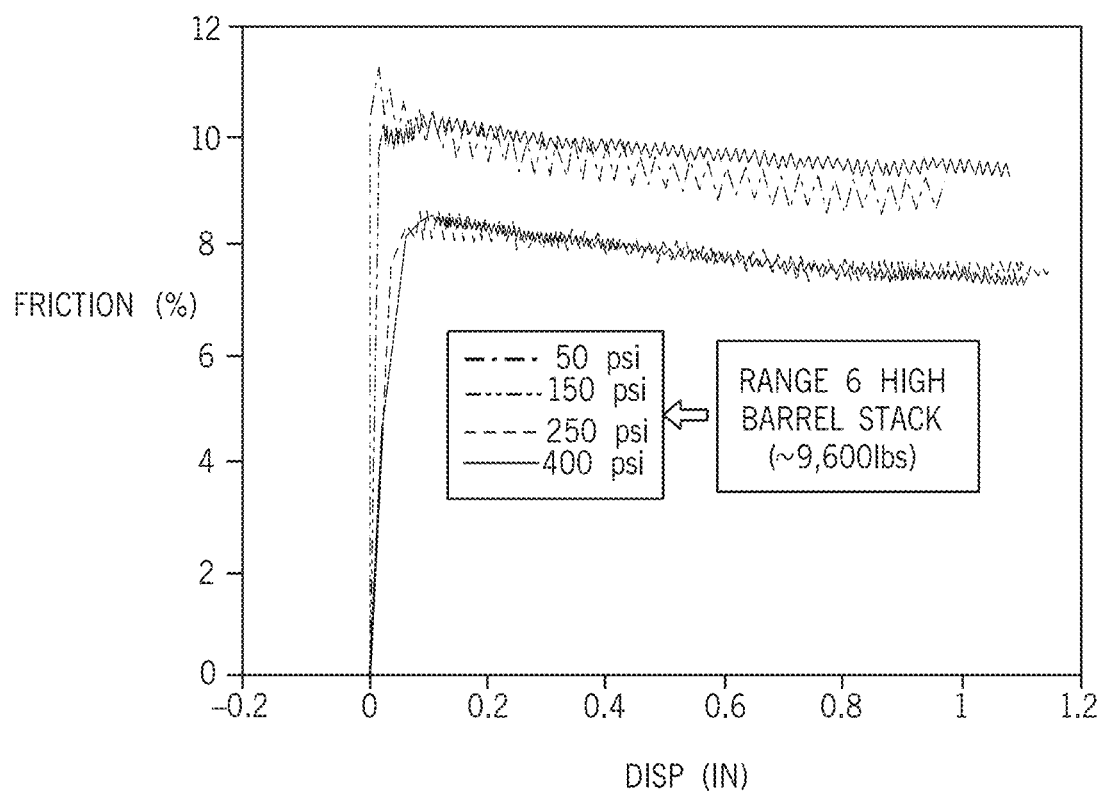
FIG. 1 shows a graph of the coefficient of friction between an isolation system and a polished concrete surface for various loads.

Described herein is a technology for, among other things, providing base isolation to protect wine barrels, casks, or other any other container from sudden ground motions, such as an earthquake, blast wave, or other event. In one example, the disclosure relates to a seismic isolation pad comprising at least a plate and a underlayer. In this example, the plate and underlayer are affixed to each other. The container or container holding structure rests on the plate. The underlayer rests on a foundation which can be the ground, floor, building foundation, or any similar structure. One of ordinary skill in the art will recognize that a foundation can be any supporting layer of a structure, and a floor can be the walking surface of a room, which may vary from simple dirt to many-layered surfaces using modern technology, such as stone, wood, bamboo, metal, or any other material that can hold a person's or equipment's weight.

In addition, the coefficients of static and kinetic friction between the underlayer and the foundation can prevent relative movement of the two plates with normal operation and yet allow the plate to move relative to the foundation during a seismic event. In an example, the coefficient of kinetic friction is low so that the underlayer can move relative to the foundation during a seismic event, but not too low so that the stability of the system is maintained when the isolation pad is moving in the seismic event. More particularly, the coefficient of static friction is low so that the isolation pad can begin moving when a seismic event occurs, but is sufficiently high to prevent movement of the pad in normal operation. Similarly, the coefficient of friction of the plate and the container or container holding structure must be sufficiently high that the isolation pad does not move relative to the containers, if it is not affixed.

In one example, the underlayer is in communication with the foundation and the plate is in communication with the container or container holding structure. The plate can be textured, so that the interface between the plate and the container or container holding structure is not smooth. The underlayer (which interfaces with the foundation) is smooth or non-textured, resulting in the desired coefficients of kinetic and static friction between the underlayer and the surface. In another example, an additional material (e.g., a lubricating fluid, plate coating, etc.) may be deposited between the underlayer and the foundation to achieve an optimal or desired coefficient of friction.

In one example, the plate and underlayer may be designed to an optimal thickness. In one example, the plate is 0.25" steel plate. In another example, the plate may be corrosion-resistant.

In some examples, the plate is welded to the container holding structure. In another example, the disclosed plate is textured with diamond-shaped ridges. Such diamond-shaped ridges create a textured surface and optimize the coefficients of static and kinetic friction between the plate and the container or container holding structure in order to maximize the stability of seismic isolation system both when the foundation is moving and when the foundation is not moving.

In accordance with the present disclosure, a sliding surface (e.g., the foundation or the plate) has a coating forming the underlayer in order to achieve the desired coefficients of kinetic and static friction. The underlayer coating may be made of a material such as polyethylene. For instance, in one example, the plate is made of a suitable material (e.g., steel) and coated with an underlayer of polyethylene. It is appreciated that one of ordinary skill could utilize high density polyethylene (HDPE), ultra-high molecular weight polyethylene (UHMW), polyester triglycidyl isocyanurate (TGIC polyester), a commercially available polyester powder coating, or a silicone-epoxy, low surface energy coating, depending on the situation and desired coefficient of friction.

In operation, the disclosed seismic isolation pad is first placed above a foundation. For example, the underlayer can be set directly on a ground, floor, building, or floor tile. Moreover, one of ordinary skill in the art will recognize that the number, size, and shape of the plate or plates may vary as desired. The container or container holding structure is placed on top of the plate and optionally affixed to it. In one example, the container holding structure is welded to the plate. One of ordinary skill would appreciate that the plate could also be affixed to the container or container holding structure with any conventional means including adhesives, mechanical fasteners, or the like. The coefficients of static and kinetic friction between the underlayer and the foundation prevent relative movement of the two plates with normal operation and yet allow the top plate to move relative to the base plate during a seismic event.

If the coefficient of friction between the foundation and the underlayer is not desirable the floor can be altered to change this property. For instance, if the floor has too low of a coefficient of friction, texture can be added such as ridges in the foundation. More commonly, the coefficient of friction is too high especially because many storage facilities use some form of concrete floors. These conventional floor types include conventional concrete, cementious urethane, epoxy suspended marble and quartz, and epoxy finished flooring.

In the concrete floor example, the floors can be machined or polished to lower the coefficient of friction. For a concrete floor, one example process is done in a series of steps beginning with a coarse diamond wheel. The diamond segments in the wheel are coarse enough to remove minor pits, blemishes, stains, or light coatings from the floor in preparation for final smoothing. This initial rough grinding is generally a three to four step process. The next steps involve fine grinding and lapping of the concrete surface using an internal impregnating sealer. Alternatively, an additional material (e.g., lubricate liquid) may be added between the base plate and the top plate to achieve the desired coefficients of kinetic and static friction.

The graph of FIG. 1 shows the effects results of polishing concrete on the coefficient of friction. This chart shows the friction versus displacement for various loads of the system. As is noted, on the graph, the example system maintains an approximate 8% coefficient of friction with a load of 9,600 lbs.

The present disclosure also relates to a seismic isolation system with a damping system. In one example, one or more external dampers are mounted besides the isolation pad and affixed to the plate, container, or container holding structure, in order to limit and/or dampen the movement of container or container holding structure in an earthquake. The damping system can further include one or more internal dampers (e.g., neoprene dampers) mounted on the uncovered part of the plate or the foundation under the container or container holding structure and capable of limiting or damping any movement.

The present disclosure also relates to methods for providing base isolation against earthquake forces. The disclosed method includes at least one of the following steps: adding an underlayer to a plate to create an isolation pad wherein the underlayer is selected to have a suitable coefficient of friction with a foundation to keep the container or container holding structure still under normal operation but allow movement in a seismic event; locating and affixing the isolation pad under the container or container holding structure; and optionally polishing or otherwise altering the foundation (e.g., floor or ground) to refine the coefficient of friction.

Figure 2A:
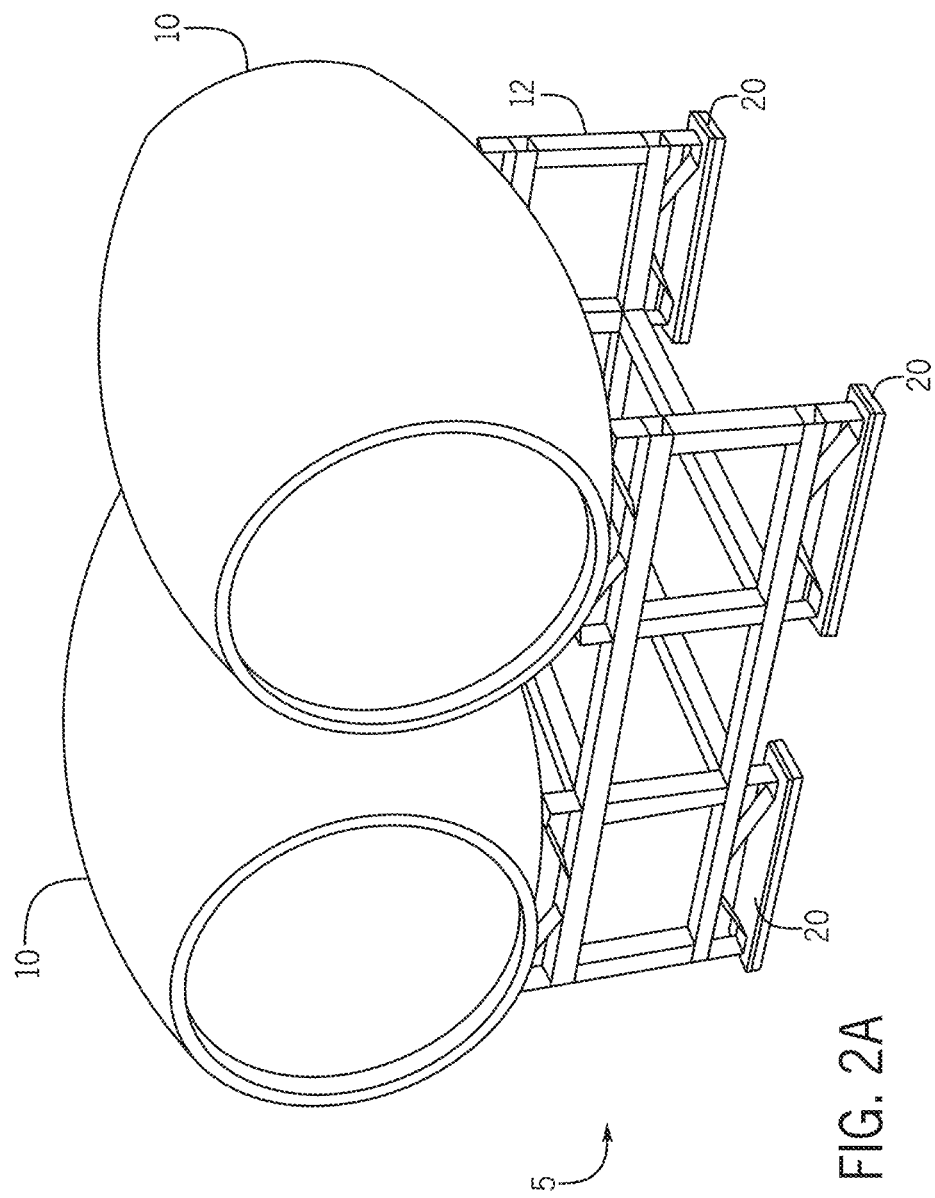
FIG. 2A is a perspective view of an isolation system installed under a wine barrel rack according to the teachings of the present disclosure.
Figure 2B:
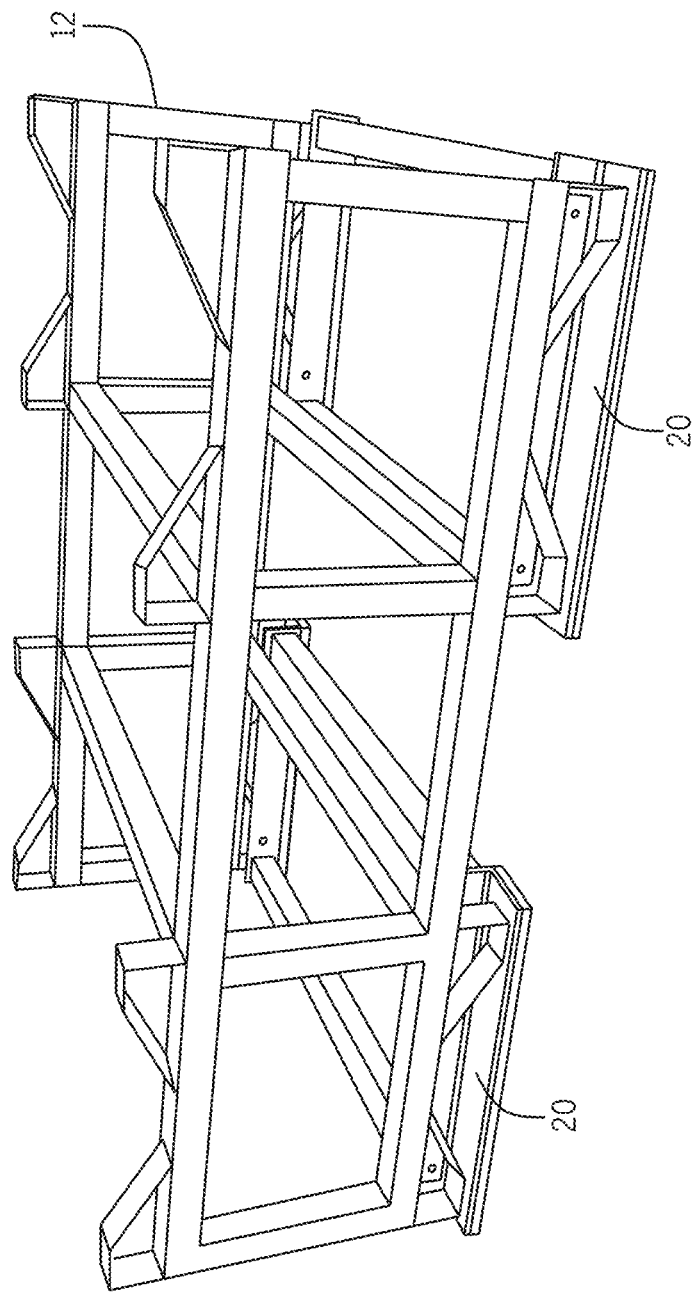
FIG. 2B is a perspective view of another example of the isolation system without containers loaded.
Figure 2C:
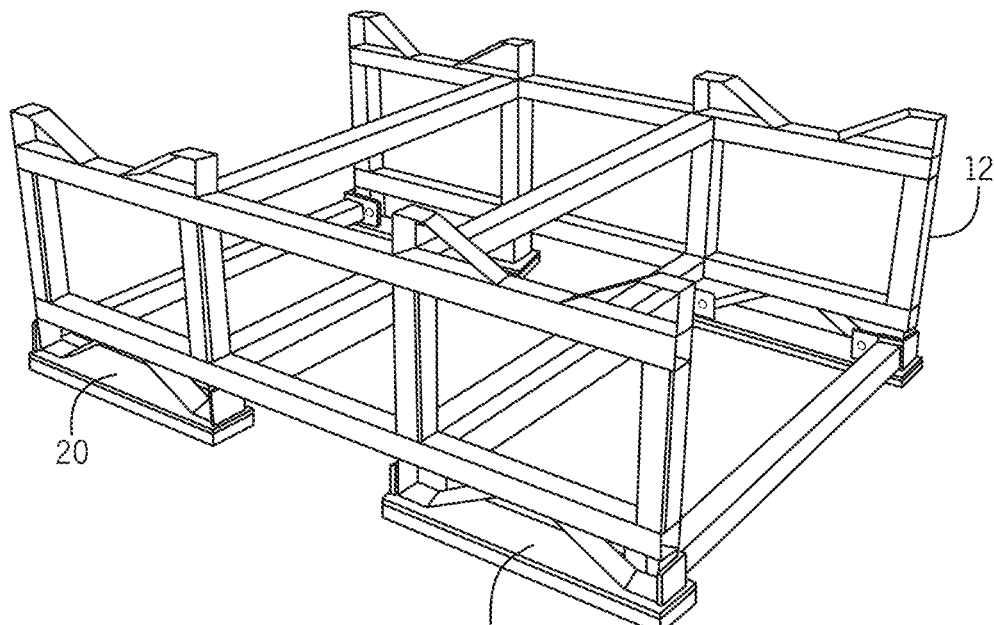
FIG. 2C is a perspective view of yet another example of the isolation system without containers loaded.

FIG. 2A shows an example isolation system 5 installed, including two containers 10, a container supporting structure 12, and several isolation pads 20. In the shown example, the isolation pads 20 are welded to the container supporting structure 12. Other embodiments for attaching isolation pads 20 and the container supporting structure 12 are shown in the figures and discussed below, including, for example, with respect to FIG. 10. FIGS. 2B and 2C show other examples of the container supporting structure 12 and isolation pads 20 without containers 10 loaded onto it.

Figure 3:
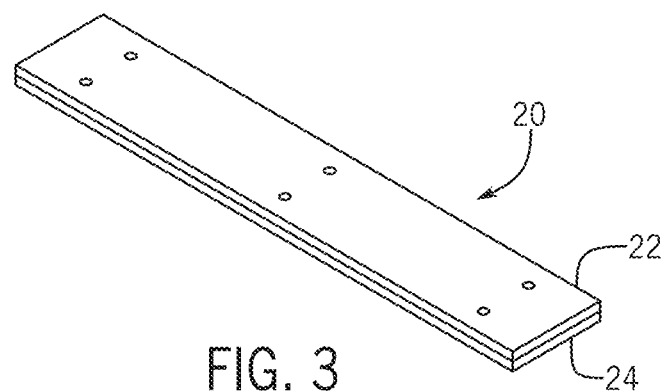
FIG. 3 is a perspective view of an isolation pad for use with the isolation system of FIGS. 2A-2C shown without the container holding structure.
Figures 4A, 4B:
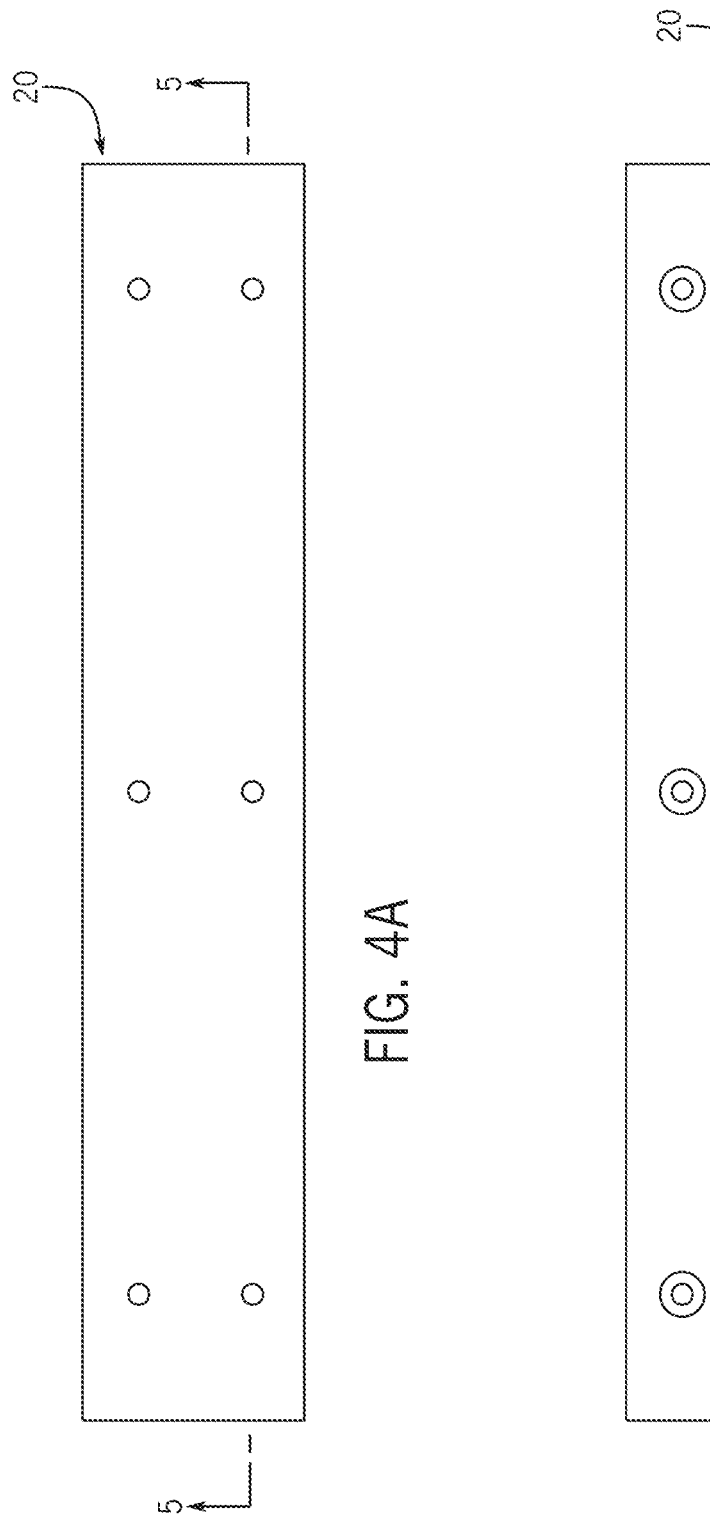
FIG. 4A is a top plan view of the isolation pad of FIG. 3.
FIG. 4B is a bottom plan view of the isolation pad of FIG. 3.

In FIG. 3, an example isolation pad 20 is shown alone. In this example, isolation pad 20 comprises a plate 22 and an underlayer 24. In this view, the plate 22 and the underlayer 24 are visible. In the example shown, the plate 22 is made of 0.25" corrosion resistant steel and the underlayer 24 is high-density polyethylene. In the example shown, these pieces are held together with mechanical fasteners (discussed below) inserted into threaded holes 26. FIG. 4A shows the isolation pad 20 from a top view and 4B shows this from a bottom.

FIG. 5 is a cross-sectional view of the isolation system 5 taken through section 5-5 in FIG. 3, a front elevated view internal to the system, showing both the isolation pad 20 and the container holding structure 12. In the example shown, the attachment mechanism between the plate 22 and underlayer 24 is visible. A screw 28 fits into a threaded hole 26 which runs through both the plate 22 and the underlayer 24. One of ordinary skill will appreciate that this is just one method of joining the plate 22 and the underlayer 24, which could also include adhesives, interlocking parts, or other suitable means.

FIG. 6 is a cross-sectional view of the isolation pad 20 taken through section 6-6 in FIG. 5. This shows the internal isolation pad 20 from a side elevated view. In this view, a second row of screws 28 can be seen piercing through the plate 22 and the underlayer 24.

Figure 8:
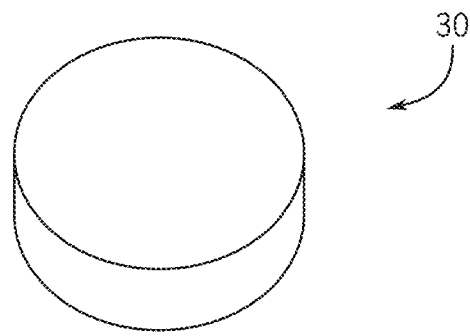
FIG. 8 is a perspective view of a cap for use with the isolation pad of FIG. 2A.
Figure 9:
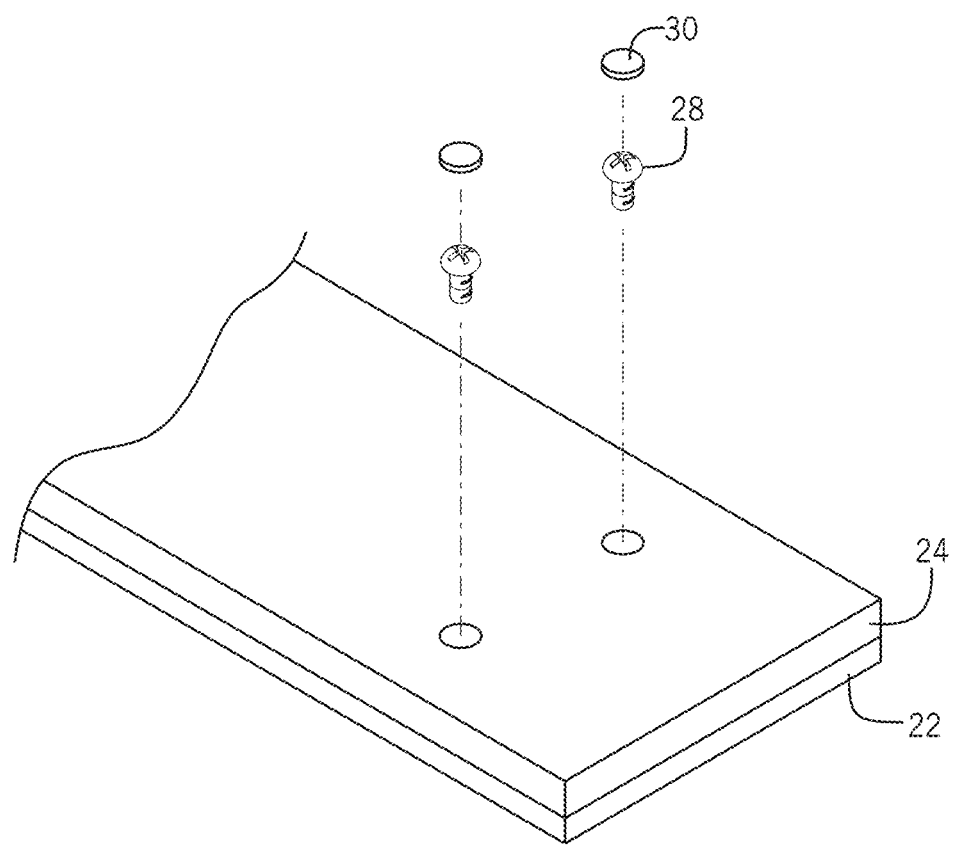
FIG. 9 is an exploded view of one end of the isolation pad of FIG. 2A.

FIG. 7 is a detailed view of attachment discussed above and first shown in FIG. 5. In this instance, in order to maintain a low coefficient of friction with the foundation, the screws 28 cannot directly contact the foundation even if the underlayer 24 deforms under loading conditions such several full barrels of wine atop the assembly. To do so, screw 28 is covered with a cap 30 and inset into to a counterbored hole 32 to create a flush surface. The cap 30, shown alone in FIG. 8, is made of the same material as the underlayer 24 and is press fit into a counterbored hole 32. FIG. 9 is an exploded view of the parts shown in FIG. 6.

Figure 10:
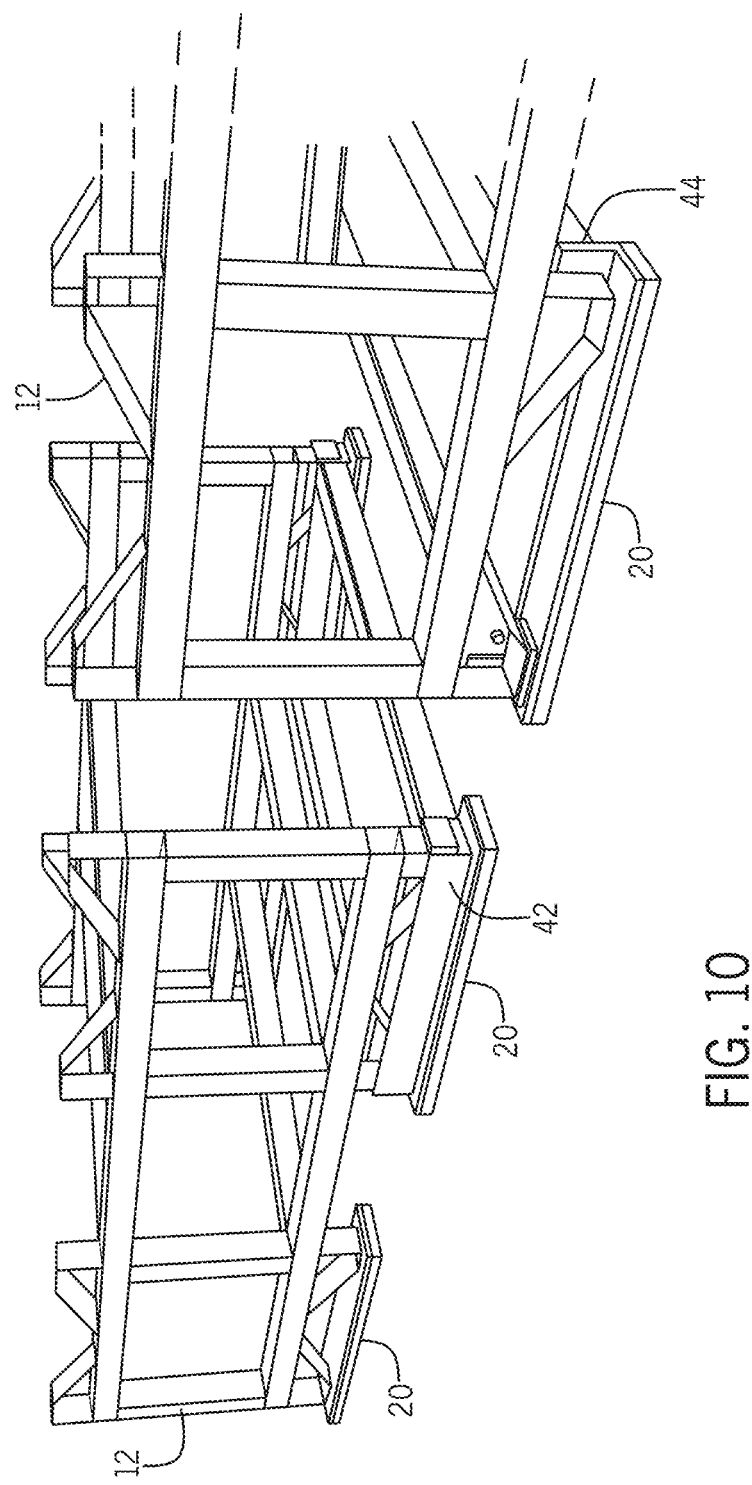
FIG. 10 shows a variety of attachment methods between the isolation pad and the container holding structure.

FIG. 10 shows a variety of methods of attaching the parts of the isolation system 5. A variety of means can be used to hold the container holding structure 12 and isolation pad 20 including welding as was mentioned above. In the figure, three attachment structures are shown. The leftmost isolation pad 20 shows the welded example previously shown in FIG. 2A. The middle isolation pad 20 has a multi-sided receiving structure 42 that made is made to fit a part of the container holding structure 12. In this example shown, the receiving structure is shaped to hold the lateral sides of the feet of the container receiving structure 12. Another example shown on the rightmost isolation pad 20 is the single sided receiving structure 44, which is fitted against the feet of the container receiving structure 12. This method allows more flexibility than multi-sided receiving structure 42.

Figure 11A:
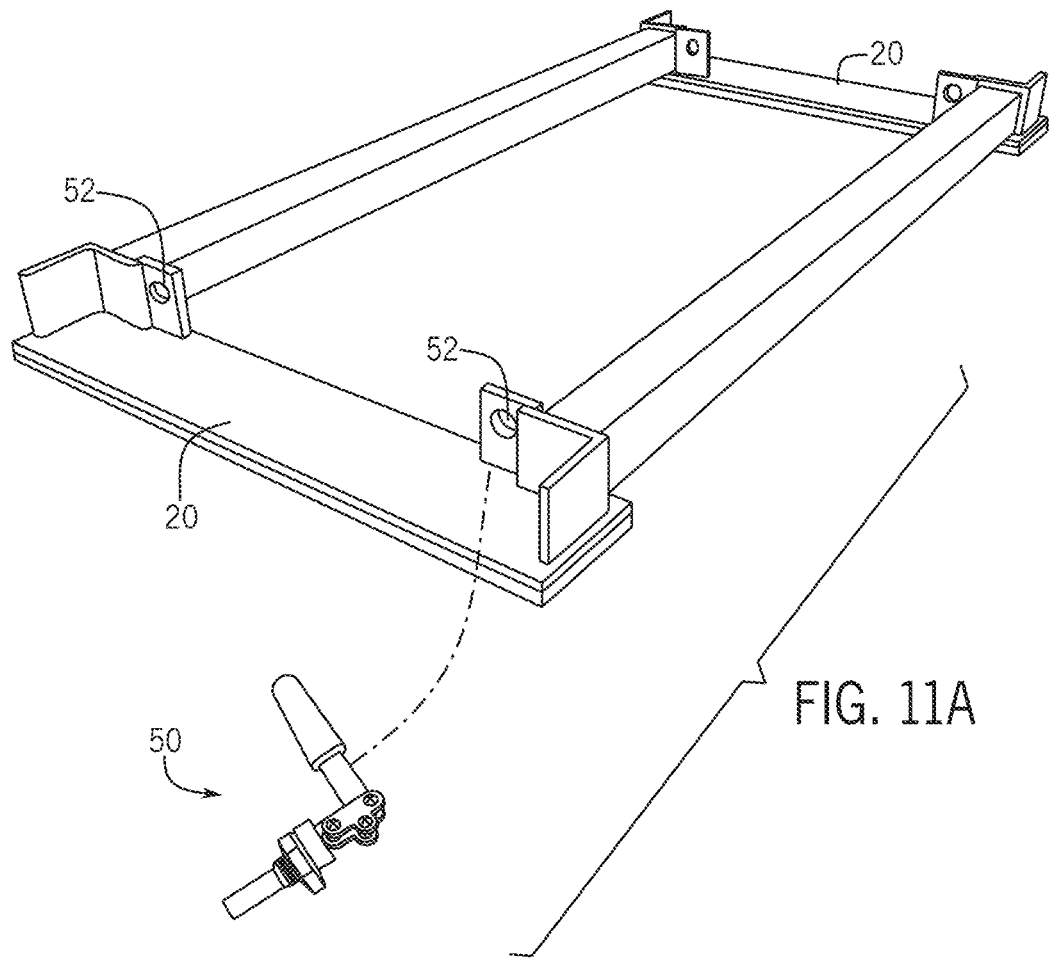
FIG. 11A shows a perspective view of another example of the isolation system loaded using releasable connectors to secure the container holding structure.
Figures 11B, 11C:
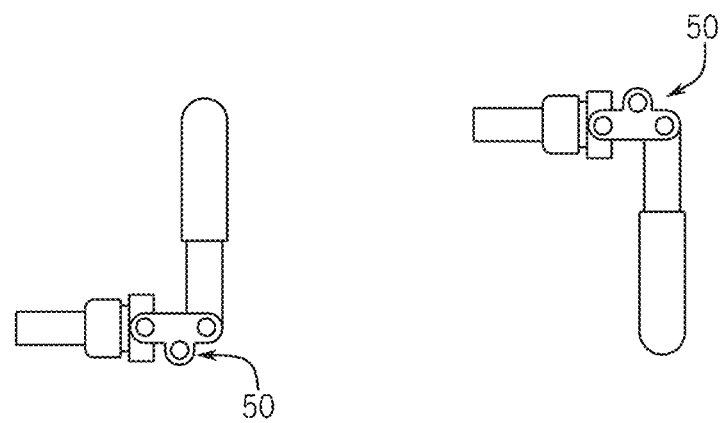
FIG. 11B shows a schematic of the example releasable connector shown in FIG. 11A in the closed position.
FIG. 11C shows a schematic of the example releasable connector shown in FIG. 11A in the open position.
Figure 12C:
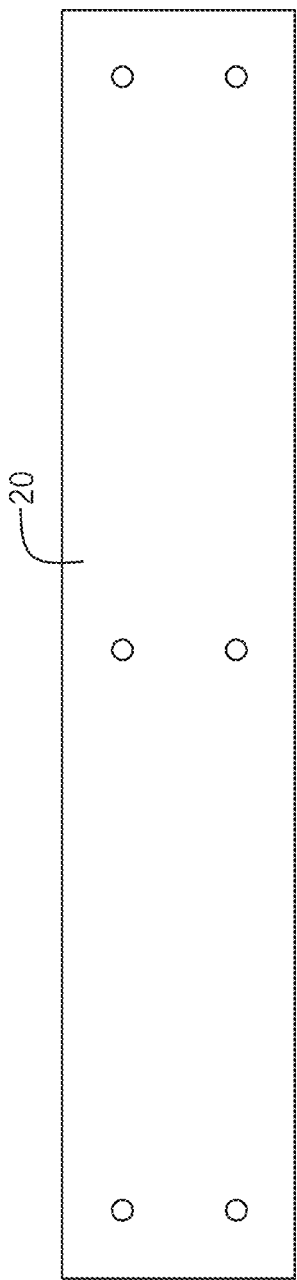
FIG. 12C is a bottom plan view of the isolation pad of FIG. 11.
Figure 12D:
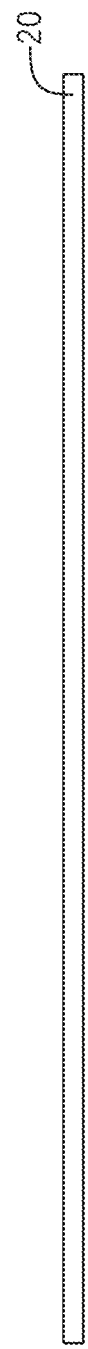
FIG. 12D is a side elevated view of the isolation pad of FIG. 11.
Figure 13C:
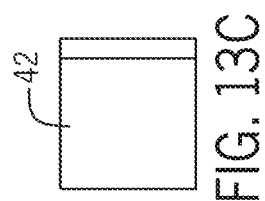
FIG. 13C is a top elevated view of the support system of the isolation pad of FIG. 11.
Figure 13B:
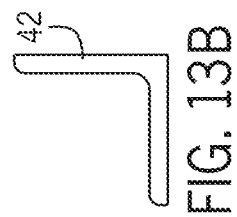
FIG. 13B is a top elevated view of the support system of the isolation pad of FIG. 11.
Figure 13A:
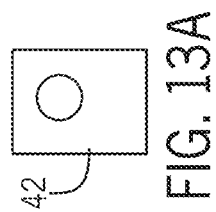
FIG. 13A is a rear elevated view of the support system of the isolation pad of FIG. 11.

FIG. 11A shows yet another example of the isolation system 5. This version uses a releasable connector, such as toggle bolts 50, to secure the container holding structure 12 to the isolation pad 20. The toggle bolts are shown in FIGS. 11B and 11C in their closed and open positions respectively. The toggle bolts 50 are inserted through apertures 52 in the receiving structure 42 as shown in FIG. 11A. FIG. 12A shows this example isolation system 5 from a top view, while FIG. 12B shows a side view. FIG. 12C shows the example isolation pad 20 of the system 5 shown in FIG. 11 and FIG. 12D shows the pad 20 from a side view. The receiving structure 42 is shown in FIG. 13A-C with aperture 52.

FIGS. 14A-D are a depiction of the drawing of yet another example seismic isolation system for installation, for example, in a datacenter to protect important information infrastructure from seismic damage. The mechanism in this example seismic isolation system is to be installed on the individual data cabinets to provide earthquake isolation to each separately. The example data cabinet isolator could be installed to protect other similar storage solutions as would be understood by one of ordinary skill in the art.

The example data cabinet isolator 60 includes a cabinet body 62 (or other storage solution), wheels 64, feet 66, an isolation pad 68, and a surface 70. The cabinet body is a storage solution either provided with a seismic solution originally or installed onto an existing storage as an aftermarket upgrade. In the example shown in FIG. 14A, the storage solution or cabinet 62 is provided with wheels 64. In other examples, a storage solution may include flexible risers, rigid legs, or any other suitable projection to separate the floor from the bottom of the main portion of the data cabinet 62 or other storage solution in place of feet 66. The feet 66 in the example shown include both a foot portion and a sliding pad 68 as shown in FIG. 14A-14B.

The sliding pad 68 is shown separated from the storage solution in FIGS. 14C and 14D. As shown in FIG. 14D, the sliding pad 68 is adapted to the shape of the foot 66 in order to provide a secure and shaped surface of the sliding pad 68 to slide against the floor surface 70. The sliding pad 68 can be made of high density polyethylene (HDPE), ultra-high molecular weight polyethylene (UHMW), polyester triglycidyl isocyanurate (TGIC polyester), a commercially available polyester powder coating, or a silicone-epoxy, low surface energy coating, depending on the situation and desired coefficient of friction for the specific implementation.

As described above, the floor surface 70 is likewise altered to achieve the desired coefficient of friction. In the example shown, the floor surface 70 is an epoxy finished floor, but as one of ordinary skill will appreciate that conventional floor types can include conventional concrete, cementious urethane, epoxy suspended marble and quartz, and epoxy finished flooring. This can be accomplished by both material selection of the feet 66 and the floor 70 as well as alteration of the surface roughness of both. Using the sliding pad 68, the UHMW "feet" will slide on either a Formica raised floor tile system or on a concrete floor finished with a silicon-epoxy low surface energy coating.

Figure 15:
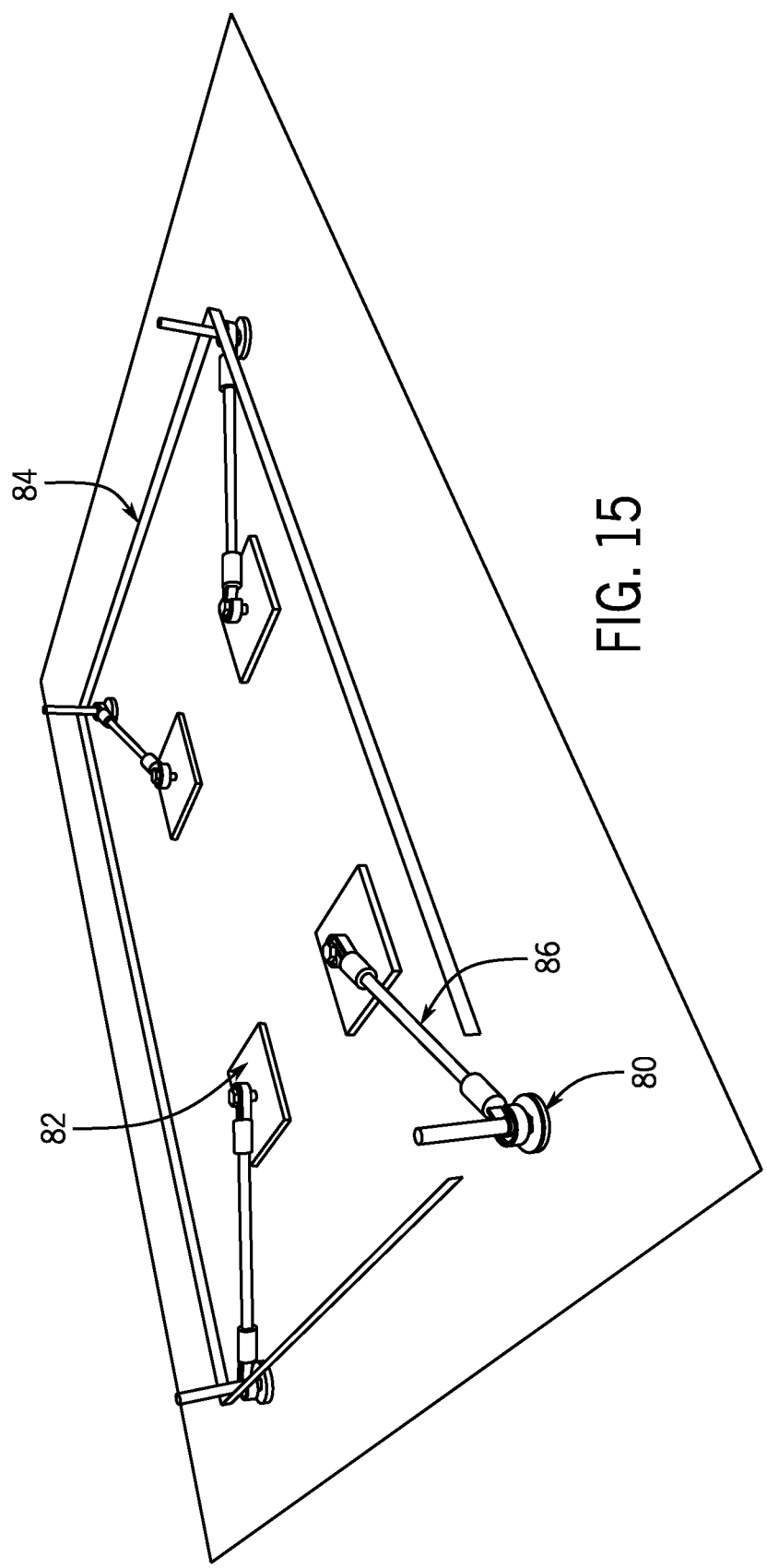
FIG. 15 is an example of a standalone cabinet seismic isolation installation according to the teachings of this disclosure.
Figure 16B:
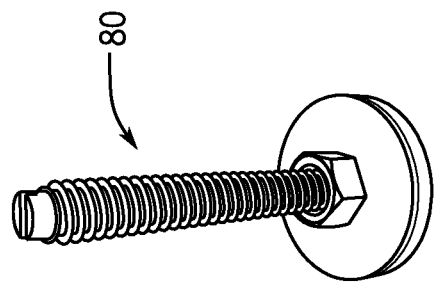
FIGS. 16A and 16B are perspective views of an example leveling leg with a sliding pad according to the teachings of this disclosure.
Figure 16A:
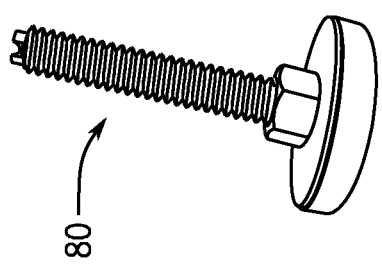

FIG. 15 is an example of a standalone cabinet seismic isolation installation. FIGS. 16A and 16B are perspective views of an example leveling leg 80 with a sliding pad. FIG. 17 shows an example of an anchor 82, leveling leg 80, and elastomeric band 86 of a portion of an example standalone cabinet seismic isolation installation. In FIG. 15, a seismic isolation system is shown that may be used for individual or standalone cabinets, for example. A perimeter 84 of a standalone cabinet is shown in FIG. 15 for reference. As one example, cabinets in datacenters or other computer/server cabinets may be isolated using the seismic isolation system shown in FIG. 15. Other types of cabinets, racks, etc. may also be isolated using the example system shown in FIG. 15.

For example, a cabinet housing one or more servers, computing devices, or any other items may have female threaded openings at the base of the cabinet to receive a male threaded leg of the leveling leg 80. When inserted into the female threaded openings of the cabinet, the male threaded leg may be rotated to level the cabinet. In various embodiments, the male threaded legs used to level a cabinet may be the example leveling leg 80 with a sliding pad as shown in FIGS. 16A and 16B. The threads may be, for example, SAE or Metric sized threads.

FIG. 15 shows how a leveling leg 80 with a sliding pad may be inserted in each of four corners of a cabinet (e.g., FIG. 15 shows the cabinet perimeter 84 though the entire cabinet is not shown). In various embodiments, other shapes of cabinets may be used, different numbers of leveling legs with sliding pads may be used, and/or the placement of the openings for inserting the leveling legs into the base of the cabinet may be different than that shown in FIG. 15. In various embodiments, a cabinet may come from a manufacturer with leveling legs that do not have sliding pads, but the original leveling legs the cabinet comes with may be replaced with the leveling legs 80 with sliding pads described herein. In this way, a standard cabinet may be used according to the various embodiments described herein by replacing the legs with the leveling legs of FIGS. 15-17, placing the cabinet on a floor surface as described herein, and anchoring the leveling legs to anchors affixed to the floor as described further below with respect to FIGS. 15 and 17.

As described herein the sliding pads may move on the surface on which the sliding pads rest. For example, the sliding pad may be made of high density polyethylene (HDPE), ultra-high molecular weight polyethylene (UHMW), polyester triglycidyl isocyanurate (TGIC polyester), a commercially available polyester powder coating, or a silicone-epoxy, low surface energy coating, depending on the situation and desired coefficient of friction for the specific implementation.

The floor on which the sliding pad sits, as described herein, may be made of, for example, a Formica raised floor tile system or on a concrete floor finished with a silicon-epoxy low surface energy coating. In this way, as described herein the sliding pads may move with respect to the floor during a seismic event.

In addition, as shown in FIGS. 15 and 17, each of the leveling legs 80 may be connected to an anchor of an anchor plate 82 with an elastomeric restraint 86. The anchor and anchor plate 82 may be made from, for example, aluminum or any other suitable material. The elastomeric bands 86 connecting the anchor and the leveling legs provides displacement control for the cabinet so that the cabinet does not move excessively with respect to the floor during a seismic event. In order to accomplish this, the anchor plates 82 are affixed to the floor. The anchor plates 82 may be fixed to floor by, for example, using double-sided high strength 3M™ tape, high-strength 3M™ adhesive, or concrete screws. Accordingly, since the anchors are fixed to the floor and the leveling legs 80 may move with respect to the floor during a seismic event, the elastomeric restraints 86 serve to limit, control, and/or dampen the movement of the cabinet during a seismic event.

In some examples, additional movement limitations and restrictions are included. In the example shown, displacement control is provided by an elastic cord system anchored to the floor. In other examples, these may include range restrictions accomplished by erecting boundaries, varying the floor alterations or utilizing pneumatic or mechanical resistances to motion. In addition, though anchors and anchor plates 82 are shown in FIG. 15 that may be located under a cabinet, anchors and anchor plates 82 may also be located outside the perimeter of the cabinet instead of or in addition to anchors and anchor plates 82 as shown in FIG. 15. In addition, such anchors or anchor plates 82 located outside a perimeter of a cabinet may further be connected to a leveling leg of the cabinet with an elastomeric restraint 86.

Although certain example methods and apparatus have been described herein, the scope of coverage of this patent is not limited hereto. On the contrary, this patent covers all methods, apparatus, and articles of manufacture fairly falling within the scope of the appended claims either literally or under the doctrine of equivalent.

We claim:

1. A seismic isolation system comprising:
   at least one adjustable foot attached to a container or support frame of the container, wherein the at least one adjustable foot has a height at least sufficient to support the container or support frame of the container such that the container or support frame of the container do not touch a surface on which the container or support frame of the container rests;
   a sliding pad affixed to a portion of the at least one adjustable foot facing the surface;
   at least one anchor plate affixed to the surface, the anchor plate comprising an anchor; and
   at least one elastomeric band releasably attached to the at least one adjustable foot and the at least one anchor plate,
   wherein the sliding pad is configured to provide a coefficient of static and kinetic friction between the sliding pad and the surface that prevents relative movement of the sliding pad and the surface in normal operation and allows the sliding pad to move relative to the surface during a seismic event.

2. The seismic isolation system of claim 1, wherein the at least one adjustable foot is removable from the container or support frame of the container.

3. The seismic isolation system of claim 1, wherein the sliding pad comprises at least one of high density polyethylene (HDPE), ultra-high molecular weight polyethylene (UHMW), polyester triglycidyl isocyanurate (TGIC polyester), a polyester powder coating, or a silicone-epoxy.

4. The seismic isolation system of claim 1, wherein the at least one adjustable foot comprises a threaded portion configured to attach to a complementary threaded portion of the container or support frame of the container.

5. The seismic isolation system of claim 4, wherein the at least one adjustable foot is height adjustable by turning the at least one adjustable foot relative to the complementary threaded portion of the container or support frame of the container.

6. The seismic isolation system of claim 1, wherein the surface comprises at least one of tile or concrete finished with a silicon-epoxy coating.

7. The seismic isolation system of claim 1, wherein the container or support frame of the container further comprises a wheel, and wherein the height of the at least one adjustable foot is further sufficient to support the container or support frame of the container such that the wheel does not touch the surface.

8. The seismic isolation system of claim 1, wherein the at least one elastomeric band has first and second open ended hooks on a first end and second of the at least one elastomeric band, respectively.

9. The seismic isolation system of claim 8, wherein each of the first and second open ended hooks are configured to releasably attach to the at least one adjustable foot or the at least one anchor plate.

10. A seismic base isolation system comprising:
- at least one adjustable foot comprising:
  - a bolt configured to attach to a container or support frame of the container;
  - a base attached to the bolt, and
  - a sliding pad affixed to the base;
- at least one anchor plate comprising an anchor; and
- at least one elastomeric band configured to releasably attach to the at least one adjustable foot and the at least one anchor plate.

\* \* \* \* \*